United States Patent
Dajaku

(10) Patent No.: US 10,164,494 B2
(45) Date of Patent: Dec. 25, 2018

(54) ELECTRIC MACHINE

(71) Applicant: FEAAM GmbH, Neubiberg (DE)

(72) Inventor: Gurakuq Dajaku, Neubiberg (DE)

(73) Assignee: FEAAM GMBH, Neubiberg (DE)

( * ) Notice: Subject to any disclaimer, the term of this patent is extended or adjusted under 35 U.S.C. 154(b) by 277 days.

(21) Appl. No.: 15/128,950

(22) PCT Filed: Mar. 17, 2015

(86) PCT No.: PCT/EP2015/055541
§ 371 (c)(1),
(2) Date: Sep. 23, 2016

(87) PCT Pub. No.: WO2015/144494
PCT Pub. Date: Oct. 1, 2015

(65) Prior Publication Data
US 2017/0110923 A1    Apr. 20, 2017

(30) Foreign Application Priority Data
Mar. 26, 2014    (DE) .................. 10 2014 104 225

(51) Int. Cl.
| | |
|---|---|
| H02K 3/28 | (2006.01) |
| H02K 17/16 | (2006.01) |
| H02K 1/14 | (2006.01) |
| H02K 1/27 | (2006.01) |
| H02K 21/00 | (2006.01) |
| H02K 21/16 | (2006.01) |

(52) U.S. Cl.
CPC .............. *H02K 3/28* (2013.01); *H02K 1/145* (2013.01); *H02K 1/2706* (2013.01); *H02K 1/2786* (2013.01); *H02K 17/16* (2013.01); *H02K 21/00* (2013.01); *H02K 21/16* (2013.01)

(58) Field of Classification Search
CPC ........ H02K 3/28; H02K 1/145; H02K 1/2706; H02K 17/16; H02K 1/2786; H02K 21/00
See application file for complete search history.

(56) References Cited

U.S. PATENT DOCUMENTS

| | | | |
|---|---|---|---|
| 6,025,668 A | 2/2000 | Kolomeitsev | |
| 6,262,508 B1 * | 7/2001 | Shibayama | ............ H02K 21/00 310/152 |
| 6,936,948 B2 * | 8/2005 | Bell | ..................... H02K 1/2786 29/596 |

(Continued)

FOREIGN PATENT DOCUMENTS

| | | |
|---|---|---|
| CN | 101199102 A | 6/2008 |
| CN | 203135614 U | 8/2013 |

(Continued)

*Primary Examiner* — Robert W Horn
(74) *Attorney, Agent, or Firm* — Morgan, Lewis & Bockius LLP

(57) ABSTRACT

The invention relates to an electric machine comprising a stator (1) and a rotor (2) movable relative to said stator. Said stator comprises two multi-stranded, concentrated windings (A1, B1, C1, A2, B2, C2) which are placed in respective slots of the stator (1). While the first winding (A1, B1, C1) comprises six coils, the second winding (A2, B2, C2) is designed to have twelve coils. The number of turns (Nw1) of the coils of the first winding is different from the number of turns (Nw2) of the coils of the second winding.

13 Claims, 6 Drawing Sheets

(56) References Cited

U.S. PATENT DOCUMENTS

| | | | | |
|---|---|---|---|---|
| 6,965,183 B2* | 11/2005 | Dooley | ................ | H02K 1/2786 |
| | | | | 310/179 |
| 8,207,648 B2* | 6/2012 | Li | ........................ | H02K 1/146 |
| | | | | 310/216.069 |
| 8,368,276 B2* | 2/2013 | Wolf | ........................ | H02K 3/28 |
| | | | | 310/179 |
| 9,502,936 B2* | 11/2016 | Shizu | ........................ | H02K 3/28 |
| 9,765,850 B2* | 9/2017 | Himmelmann | ............ | F16F 7/00 |
| 9,923,439 B2* | 3/2018 | Finkle | ..................... | H02K 17/26 |
| 2004/0057301 A1 | 3/2004 | Lehr et al. | | |
| 2007/0273236 A1 | 11/2007 | Kaumann et al. | | |
| 2009/0021095 A1 | 1/2009 | Tatematsu et al. | | |
| 2014/0009027 A1* | 1/2014 | Kawai | .................... | H02K 3/00 |
| | | | | 310/177 |
| 2014/0042851 A1* | 2/2014 | Takemoto | .............. | H02K 1/243 |
| | | | | 310/114 |
| 2015/0108869 A1* | 4/2015 | Seki | ........................ | H02K 1/24 |
| | | | | 310/198 |
| 2015/0340936 A1* | 11/2015 | Matsumoto | ............. | B60L 11/14 |
| | | | | 310/115 |
| 2016/0248307 A1* | 8/2016 | Kubota | ................... | H02K 16/02 |
| 2017/0110923 A1* | 4/2017 | Dajaku | ..................... | H02K 3/28 |
| 2018/0013329 A1* | 1/2018 | Aoyama | .................. | H02K 3/12 |

FOREIGN PATENT DOCUMENTS

| | | |
|---|---|---|
| DE | 19650717 A1 | 6/1997 |
| DE | 19754920 A1 | 6/1999 |
| DE | 10112543 A1 | 10/2002 |
| DE | 69912504 T2 | 5/2004 |
| DE | 102006024241 A1 | 11/2007 |
| DE | 112005003603 T5 | 4/2008 |
| DE | 102008044276 A1 | 6/2010 |
| EP | 0945963 A2 | 9/1999 |
| EP | 1732011 A1 | 12/2006 |
| EP | 1860757 A1 | 11/2007 |
| WO | 2010063546 A1 | 6/2010 |

* cited by examiner

ELECTRIC MACHINE

The present invention relates to an electric machine comprising a stator and a rotor movable relative to the stator.

BACKGROUND OF THE INVENTION

Usually, it is desirable to achieve a high level of efficiency and a low-noise running of the machine in electric machines. To that end, it is required to suppress higher harmonics of the magnetomotive force as much as possible and to use only the harmonic that represents the operating wave of the machine.

This is enabled by means of distributed windings, for example.

However, distributed windings involve high manufacturing efforts and lead to higher manufacturing costs as a result.

There is a demand for a concentrated winding that has a low harmonic component, i.e. few higher harmonics of the magnetomotive force, and that can be manufactured with little effort.

The object of the invention is to provide an electric machine having a concentrated winding, the machine comprising few undesirable harmonics besides the fundamental wave.

The object is achieved by the subject-matter of patent claim 1.

Embodiments and advantageous developments are indicated in the dependent patent claims.

SUMMARY OF THE INVENTION

An electric machine according to the proposed principle comprises a stator and a rotor movable relative to the stator. The stator comprises at least two winding systems which are referred to as a first and at least a second winding. Said windings are each designed as a multi-stranded concentrated winding.

The two windings are placed in respective slots of the stator provided for the windings. The first winding comprises six coils which are placed in six slots and assigned to different electric strands. The second winding comprises twelve coils which are placed in twelve slots of the stator and which are assigned to different electric strands as well. The number of turns of the coils of the first winding is different from the number of turns of the coils of the second winding.

Preferably, the coils of the first and second windings are wound around in each case exactly one tooth of the stator, with one tooth being formed between to neighboring slots of the stator, respectively.

The first and second windings may have different winding topologies.

Calculations have shown that the combination of the proposed two windings, each designed as concentrated multi-stranded winding, results in an almost complete deletion of higher harmonic components of the magnetomotive force above the fundamental wave used as the operating wave here.

Preferably, the second winding is arranged closer to the airgap of the electric machine than the first winding, with the air gap formed between stator and rotor.

Here, the coils of the second winding are designed to have a smaller overall cross-section than the coils of the first winding. Preferably, the coils of the second winding are provided with a smaller number of turns than the coils of the first winding.

In one embodiment, the slots of the first winding are distributed equally along the circumference, i.e. the slots are arranged at a distance of 360°/6p. Here, p is the number of pole pairs. Just as well, the slots of the second winding are preferably distributed symmetrically along the circumference so that said slots are spaced from one another at an angle of 360°/12p, respectively.

The ratio of the number of turns of the coils of the first winding relative to the number of turns of the coils of the second winding is preferably in an interval between 1.5 and 5, with the interval boundaries included.

Further preferably, n is a natural number and the number of turns of the coils of the first winding is 9×n, while the number of turns of the coils of the second winding is 4×n. As a result, the ratio of the number of turns of first to second winding is 9:4.

In this case, this results in a winding factor of approximately 35.3%.

The winding factor for other ratios of number of turns is between 30 and 40% depending on the ratio of the number of turns of the first and the second winding.

Preferably, the first and second windings are each designed to have 3 strands. As a result, the first and second windings can readily be connected to a three-phase electric power system.

If, for example, the machine is designed as an asynchronous machine, it is advisable to provide an electric converter between the winding of the machine and the electric three-phase power system. The two windings can be connected to said converter preferably in a star delta connection. Here, the three electric strands of the second winding form the inner triangle of the circuitry, while the nodes of the triangle across the coils of the respective three strands of the first winding are connected to the three phases of the converter and of the power network, respectively.

In the case of the star delta connection, the first winding system is preferably shifted relative to the second winding system by an angle of 0° to one another.

In an embodiment having three strands A, B, C, this means that two coils of strand A are arranged to face the rotor in the radial direction with respect to the coil of the first strand A of the first winding, for example. The same applies to the other strands B and C, so that in each case the coils of the same strand of different windings are arranged over one another in the radial direction.

As an alternative, a star-star connection or a delta-delta connection can be applied instead of the star-delta connection. In this case, preferably the first and the second winding are mechanically shifted to one another at an angle of 90°.

The electric machine may be a linear machine, an axial-flux type machine, a radial-flux type machine, an asynchronous machine and/or a synchronous machine.

The machine may be set-up as a machine with internal or external rotor. The rotor may be of one of the following types: a cage rotor, a multi-layered rotor in the case of the asynchronous machine, or a permanent-magnet rotor, a rotor with buried magnets or an electrically supplied rotor, in particular a full-pole type rotor, salient-pole type rotor, heteropolar rotor, homopolar rotor or a synchronous reluctance rotor in the case of the synchronous machine.

The proposed two-pole concentrated winding comprises the same spectrum of the magnetomotive force as a distributed winding with q=2, with q being the number of coils per phase per pole.

In the above mentioned embodiment, in which a star delta connection shall not be applied, but instead a pure stare or pure delta connection of the electric strands, respectively, a good characteristic of the magnetomotive force is achieved even for other ratios of the number of turns of the coils of the first winding relative to the number of turns of the coils of the second winding, for example of 3:8. The winding factor varies between 27 and 38% here.

Preferably, the ratio of the number of turns of the coils of the first winding relative to the number of turns of the coils of the second winding is 4:1 in this embodiment, resulting in a winding factor of approximately 31.1%. As a result, the winding factor is less than for the star delta connection.

Further configurations and advantageous effects of the proposed principle are described by means of multiple exemplary embodiments by means of various drawings in the following.

BRIEF DESCRIPTION OF THE DRAWINGS

The figures show in.

DETAILED DESCRIPTION

Figure 1:
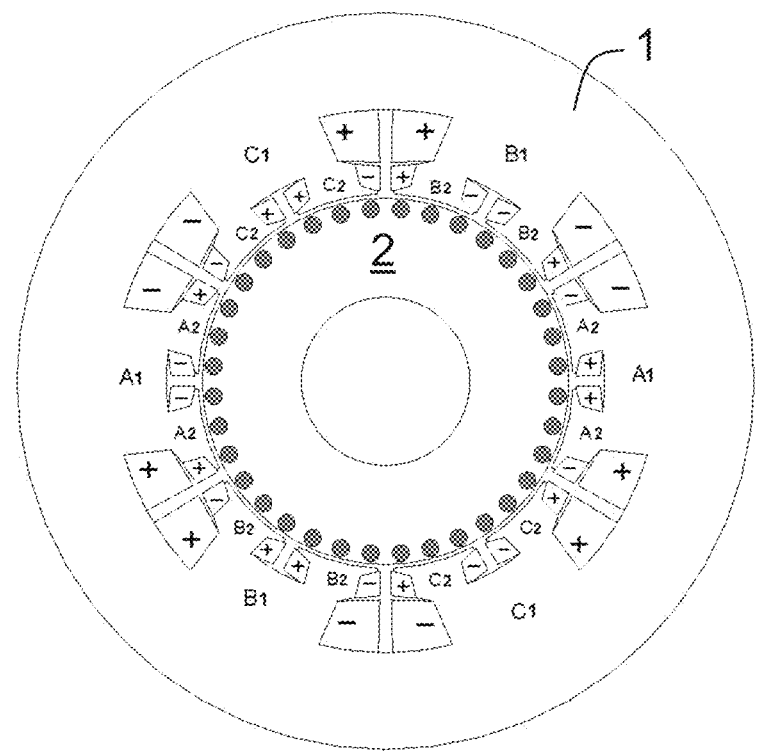
FIG. 1 a first exemplary embodiment of an electric asynchronous machine according to the proposed principle,
FIG. 2 the distribution of the magnetomotive force across one revolution using the example of FIG. 1,
FIG. 3 the harmonics of the magnetomotive force using the example of FIG. 1,
FIG. 4 the exemplary star delta connection of the windings using the example of FIG. 1,
FIG. 5 the design as a permanent magnet synchronous machine as an example,
FIG. 6 another exemplary embodiment of an asynchronous machine of the proposed principle for star or delta connection,
FIG. 7 the distribution of the magnetomotive force across one revolution using the example of FIG. 6,
FIG. 8 the harmonics of the magnetomotive force using the example of FIG. 6,
FIG. 9 the relative arrangement of the winding systems in the stator as an example,
FIG. 10 the application of the example of FIG. 6 to a permanent magnet-excited synchronous machine,
FIG. 11 the exemplary connection of the winding strands of FIGS. 6, 9 and 10 in a star connection, and
FIG. 12 the exemplary connection of the windings strands of FIGS. 6, 9 and 10 in a delta connection.

FIG. 1 shows a first exemplary embodiment of an electric machine according to the proposed principle comprising a stator 1 and an internal rotor 2.

The rotor 2 is designed as a cage rotor of the present asynchronous machine.

The stator 1 comprises two three-phase concentrated windings. The first winding comprises the three strands A1, B1, C1. The second winding comprises the three strands A2, B2, C2. Each of said strands is assigned to an electric phase of a three-phase electric power system, respectively.

Both windings are placed in respective slots in the stator. Here, the second winding is closer to an air gap of the machine formed between stator 1 and rotor 2, while the first winding is arranged further radially outward in the stator, i.e. at a greater distance to the rotation axis. The first winding comprises six coils, with two coils of the same phase of which being arranged opposite to one another, respectively. The second winding comprises twelve coils, with two coils of the same electric phase being wound around directly neighboring teeth, respectively. Here, a mechanic shift between the first and second windings is not provided so that the coils of the same phase of the first and second windings are in each case arranged over one another in radial direction. Here, in each case two coils of the second winding are formed in the radial direction beneath a coil of the first winding.

The exact arrangement of the slots and the coils of the winding systems results from the drawing according to FIG. 1.

The number of turns Nw1 of the coils of the first winding is different from the number of turns Nw2 of the coils of the second winding.

Since said windings are concentrated windings, specifically a tooth-concentrated winding, the coils of the two winding systems are each wound around exactly one tooth.

As can be discerned by means of FIG. 1, the slots running in the axial direction of both the first and the second winding are distributed along the circumference of the stator in a symmetric and equidistant manner.

With respect to the rotation axis of the machine, all slots of the first winding are arranged in a first radius, all slots of the second winding being arranged with a smaller second radius.

The number of turns Nw1 of the coils of the first winding is presently 9×n, while the number of turns of the coils of the second winding is 4×n. Here, n is a natural number.

As described later in conjunction with FIG. 4, the strands of the three-phase first winding and of the three-phase second winding are interconnected via a star delta connection.

Figure 2:
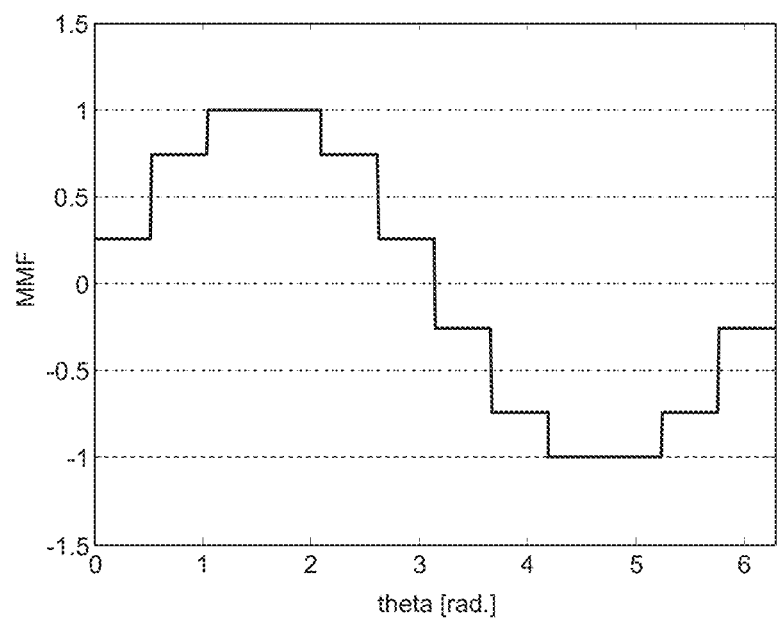
Figure 3:
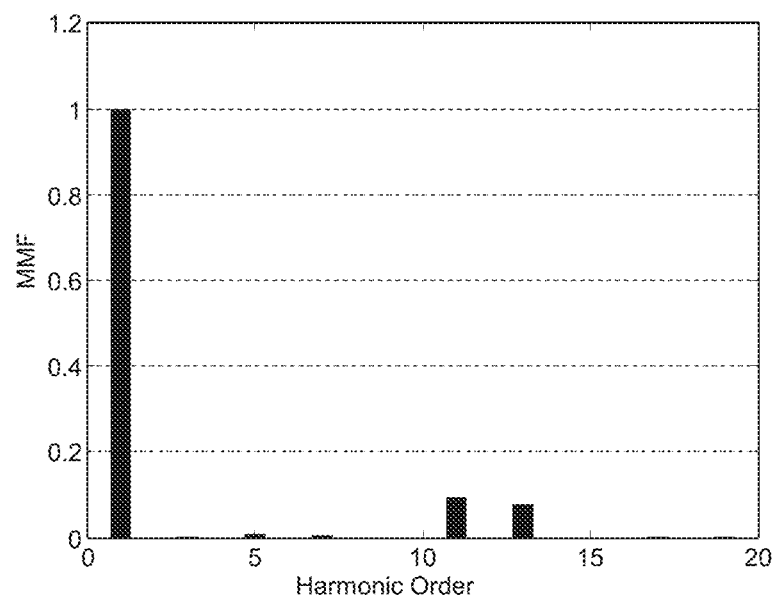

As will become apparent from FIGS. 2 and 3, the first harmonic of the fourier decomposition of the magnetomotive force is used as the fundamental wave in the proposed machine. Higher harmonics do almost not occur, achieving a high level of efficiency as well as a uniform course the torque in the machine. The spectrum of the magnetomotive force is almost identical to the one of a machine having a distributed winding with q=2, q being the number of coils per phase per pole. The winding factor of the machine according to the embodiment of FIG. 1 is approximately 35.3%.

Against this background, the proposed machine is particularly suitable for high voltage applications and electric machines that have a low number of poles. Here, the proposed machine provides significant advantages in production, particularly in manufacturing costs, compared to a machine having a distributed winding, due to the structure of the proposed machine.

Figure 4:
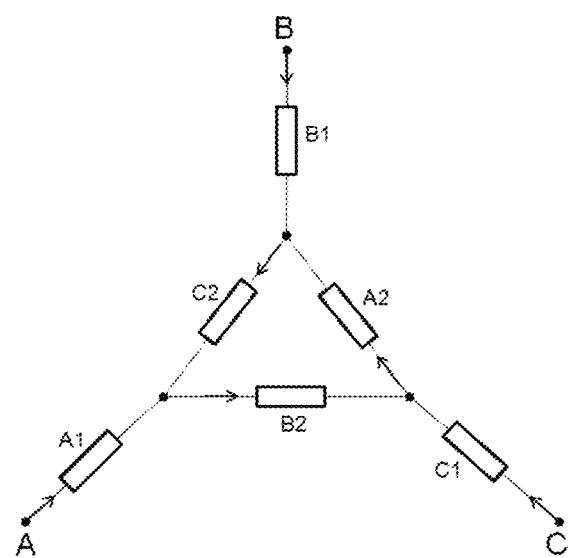

FIG. 4 shows the star delta connection of the in each case three strands A1, B1, C1 of the first winding and of the three strands A2, B2, C2 of the second winding. As can be seen, the three strands of the second winding A2, B2, C2 are connected in the shape of a triangle. The corners of the triangle are each connected to the three power supply sided phases A, B, C via the respective complementary strands A1, B1, C2 of the first winding. The term complementary means each electric phase is connected once to one circuit node. For example, the third strand of the first winding C1 is connected to the first and second strand of the second winding A2, B2.

Figure 5:
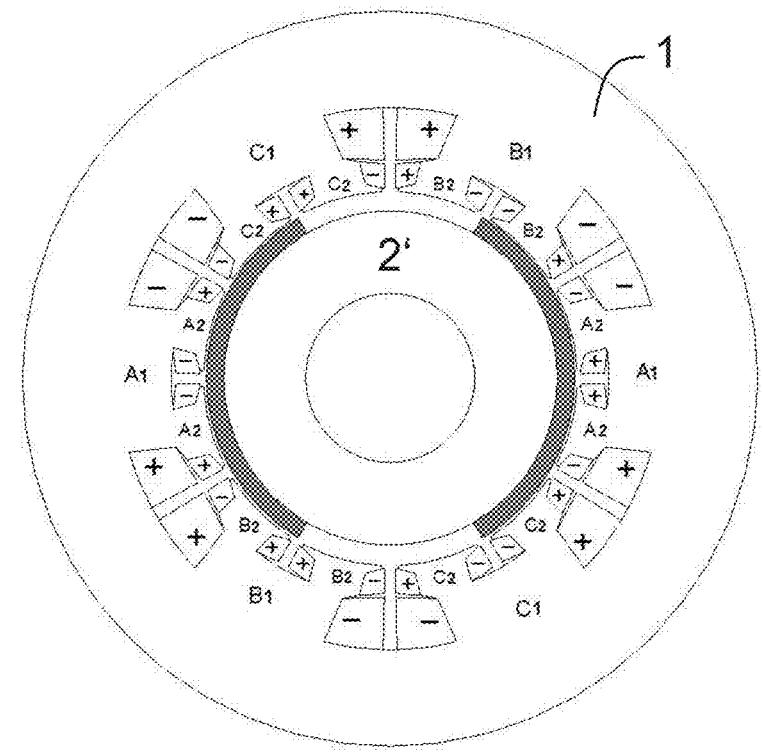

In deviation to FIG. 1, FIG. 5 shows an electric machine comprising a stator 1, with the rotor 2' being configured as a rotor with two opposite permanent magnets, however, not configured as a cage rotor as in FIG. 1. The machine of FIG. 5 is designed as a synchronous machine. The stator 1 including the windings A1, B1, C1, A2, B2, C2 corresponds to the one of FIG. 1 in terms of its structure and advantageous functionality, and will thus not be described again at this point.

Figure 6:
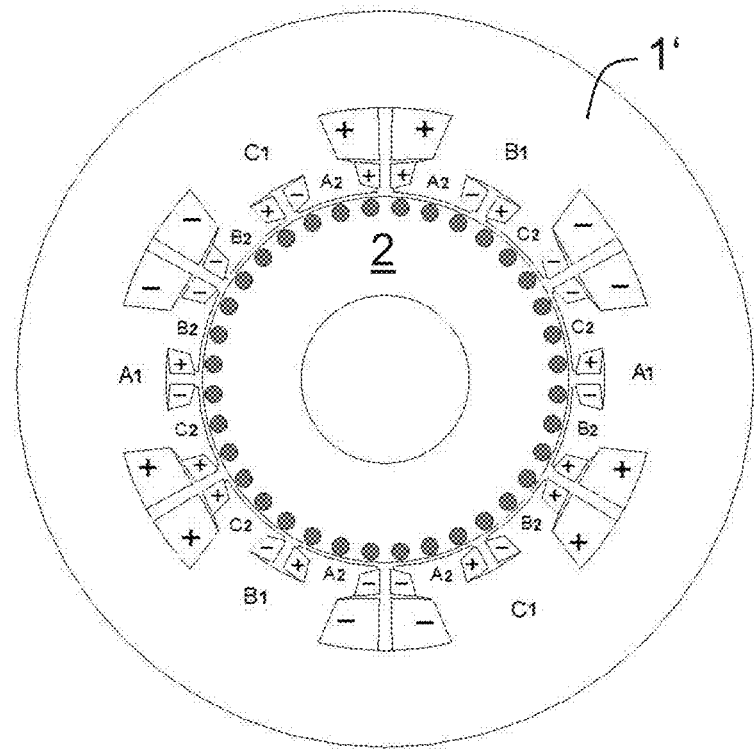

Based upon FIG. 1, FIG. 6 shows an electric machine having the same rotor 2 but with another configuration of the stator 1'. While the first winding A1, B1, C1 in the stator of the machine of FIG. 6 has the same design as in FIG. 1, the second winding A2, B2, C2 is designed to have the same topology as in FIG. 1, but arranged to be turned 90° about the rotation axis in the mathematically positive sense relative to the first winding. This shift is described by means of FIG. 9.

For the rest, the machine of FIG. 6 is identical to the machine of FIG. 1 and therefore will not be described again.

Figure 11:
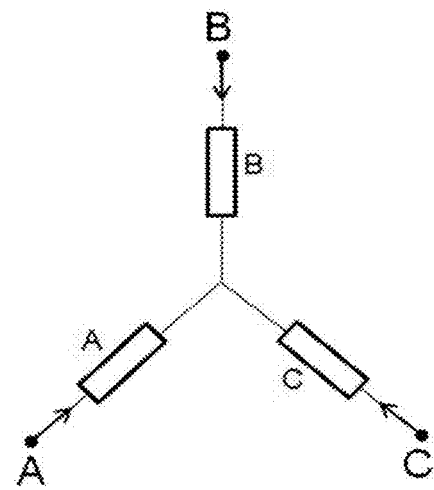
Figure 12:
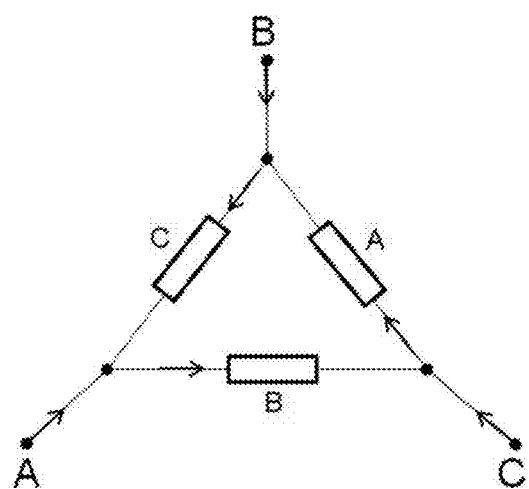

In contrast to the machine of FIG. 1, due to the rotation of the second winding system relative to the first winding, the machine may be supplied in a different fashion on the electric side. To that end, a pure star connection as shown in FIG. 11, or a pure delta connection as shown in FIG. 12 is provided instead of a star delta connection.

Figure 7:
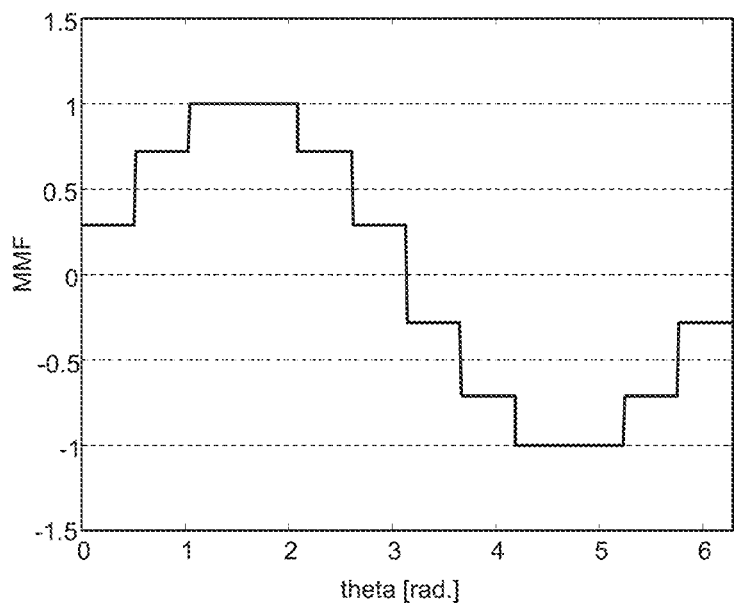
Figure 8:
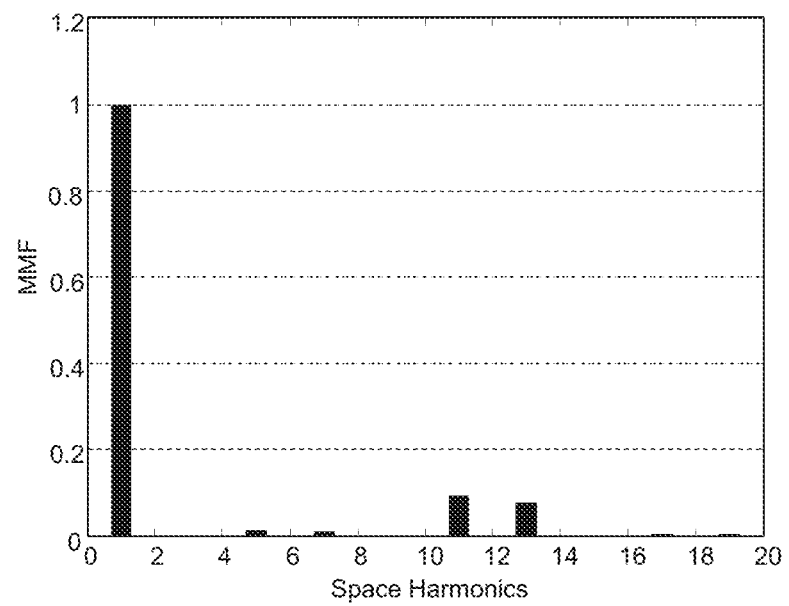

The advantageous effects of the embodiment of FIG. 6 can be seen, in turn, by means of the distribution of the magnetomotive force according to FIG. 7, plotted against the angle, or by means of the decomposition into harmonics according to FIG. 8. The latter one clearly shows, just like FIG. 3, that almost no noteworthy higher harmonics are present in the fourier decomposition of the magnetomotive force besides the fundamental wave, which is used as operating wave.

Figure 10:
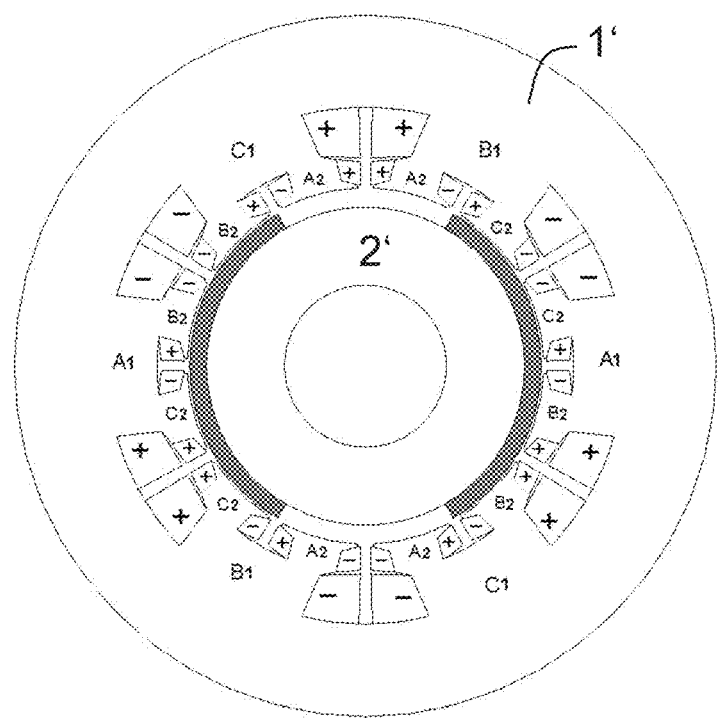

FIG. 10 in turn shows the modification of the asynchronous machine having a cage rotor 2 based upon FIG. 6, which is designed with a permanent magnet rotor 2' and as a synchronous machine in FIG. 10.

Figure 9:
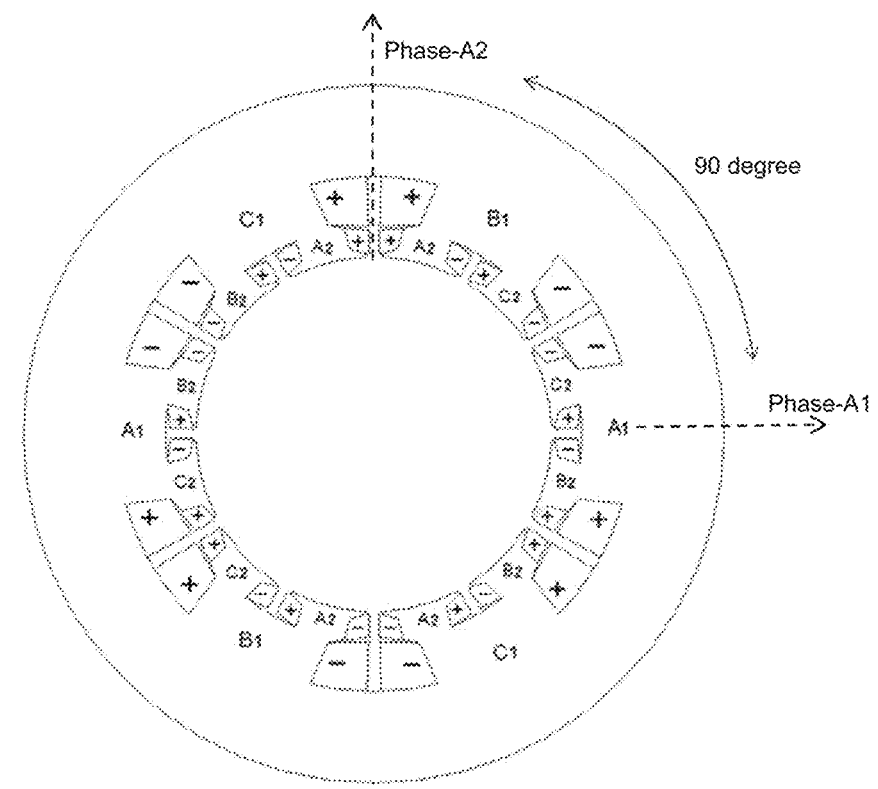

The ratio of the number of turns of the first winding relative to the second winding is 4/1 in FIGS. 6, 9 and 10, not 9/4 as in FIG. 1. This results in a winding factor of approximately 31.1% in said embodiments. The winding factor is thus smaller than in the winding according to FIG. 1, which is designed for a star delta connection.

The invention claimed is:

1. Electric machine, comprising a stator and a rotor movable relative to the stator, in which
    the stator comprises a first winding and at least a second winding which are each designed as multi-stranded concentrated windings and placed in respective slots of the stator,
    the first winding comprises six coils which are placed in six slots,
    the second winding comprises twelve coils which are placed in twelve slots.

2. Electric machine according to claim 1,
    in which the number of turns of the coils of the first winding is different from the number of turns of the coils of the second winding.

3. Electric machine according to claim 1 or 2,
    in which the coils of the first and second winding are each wound around exactly one tooth formed between two neighboring slots.

4. Electric machine according to claim 1 or 2, in which an air gap is provided between stator and rotor and the second winding is arranged closer to the air gap than the first winding.

5. Electric machine according to claim 1 or 2, in which the slots of the first and second winding are each distributed equally along the circumference of the stator.

6. Electric machine according to claim 1 or 2, in which the ratio of the number of turns of the coils of the first winding relative to the number of turns of the coils of the second winding is in an interval between 1.5 and 5, with the interval boundaries being included.

7. Electric machine according to claim 1 or 2, in which the number of turns of the coils of the first winding is 9 times n and in which the number of turns of the coils of the second winding is 4 times n, with n being a natural number.

8. Electric machine according to claim 1 or 2, in which the first and the second winding each is a three-phase winding.

9. Electric machine according to claim 1 or 2, wherein the first and the second winding are interconnected in a star delta connection.

10. Electric machine according to claim 1 or 2, wherein the first and the second winding are shifted relative to one another at an angle of 90 degree.

11. Electric machine according to claim 1 or 2, in which the electric machine comprises one of the following types: linear machine, axial-flux type machine, radial-flux type machine, asynchronous machine, synchronous machine.

12. Electric machine according to claim 1 or 2, which is constructed as a machine having an internal rotor or an external rotor.

13. Electric machine according to claim 1 or 2, in which the rotor is of one of the following types: a cage rotor, a multi-layered rotor in the case of the asynchronous machine, or a permanent-magnet rotor, a rotor with buried magnets or an electrically supplied rotor, in particular a full-pole type rotor, salient-pole type rotor, heteropolar rotor, homopolar rotor or a synchronous reluctance rotor in the case of the synchronous machine.

* * * * *